United States Patent Office 2,722,528
Patented Nov. 1, 1955

2,722,528

PREPARATION OF FINELY DIVIDED CELLULOSE PLASTICS

Wallace B. Johnson, Hopewell, Va., assignor to Hercules Powder Company, Wilmington, Del., a corporation of Delaware No Drawing. Application May 8, 1951, Serial No. 225,280

8 Claims. (Cl. 260—223)

This invention relates to the preparation of film-forming plastics in a finely-divided form. In one of its aspects this invention relates to the preparation of finely-divided cellulosic plastics.

The preparation of plastic coating compositions is normally accomplished by dissolving the plastic and modifiers in a suitable solvent, and films and coatings then are formed by evaporation of the solvent from a thin layer of the resulting composition. Serious economic limitations on this method are the solubility characteristics of the plastic in the solvent, the relatively high viscosity of the solutions, and the cost of solvent, whether lost or recovered. An alternate method, emulsification, still requires a solvent for the plastic.

In recent years a new method of applying coatings of vinyl resin compositions has met with wide acceptance, first in Germany and Great Britain, and more recently in the United States. This procedure involves dispersion of the plastic, in finely-divided form, with or without plasticizer in a nonsolvent medium, and coatings of such dispersions laid down on various substrata are coalesced to continuous films by application of heat and/or pressure. The disadvantages of solvent application as listed above are thus eliminated. This method of applying plastic coatings has been limited to vinyl resin compositions since the vinyl plastics by virtue of their preparation by emulsion polymerization are easily recovered in the finely-divided state at little added expense. No examples are known of the use of finely-divided cellulosic plastics in this manner because such plastics are not so easily produced in a finely-divided state as are vinyl plastics. In fact, no satisfactory means of preparing cellulosic plastics and chlorinated rubber in the same state of subdivision has been developed.

Two processes have been tried for the preparation of cellulosic plastics in a finely-divided form. One involves mechanical grinding of the plastic and the other involves spray-drying of a solution of the plastic. Mechanical grinding is entirely inadequate for obtaining a particle size suitable for use in film formation since it results in a powder of relatively large average particle size and irregularly shaped particles. Such a powder does not produce a homogeneous film, and the powder is characterized by a low bulk density which also makes efficient film formation difficult.

Spray-drying a solution of the plastic produces better results than mechanical grinding, but it has also proved to be inadequate. The average particle size obtained by such a process is from 15 to 30 microns, with maximum sizes ranging from 65 to 180 microns in diameter. Microscopic examination of the product revealed that the solution-sprayed cellulosics are irregularly shaped, consisting of solid particles, hollow spheres, and fine threads. The bulk density is rather low, ranging from 0.06 to 0.14 g./ml. An additional drawback to this method is the relatively large amount of solvent required in the solution and to be recovered per pound of product.

It is an object of this invention to provide a novel and improved method for preparing film-forming plastics in a finely-divided form.

It is another object of this invention to provide a novel and improved process for preparing cellulosic plastics in a finely-divided form and having properties superior to the prior art preparations.

It is another object of this invention to provide a novel process for preparing cellulosic plastics suitable for use in coating compositions heretofore not available in the prior art.

Further and additional objects of this invention will be apparent from the detailed disclosure that follows.

In accordance with this invention it is possible to prepare film-forming plastics in a finely-divided form having improved characteristics over similar prior art resins.

The general procedure of preparing the finely-divided plastics is as follows: A lacquer phase containing a film-forming plastic, for example, a cellulosic plastic or chlorinated rubber, is prepared by dissolving the plastic in a substantially water-immiscible solvent. A lacquer-in-water emulsion is then prepared with the solution containing the plastic, and a stream of the resulting emulsion is passed into a vessel containing an agitated body of a liquid medium in which the plastic is insoluble. The stream of emulsion enters the vessel either above or below the level of the agitated liquid medium, and, if desired, the emulsion can be sprayed into the vessel in fine droplet or mist form. The temperature and pressure of the liquid medium are maintained at levels sufficient to effect volatilization of the plastic solvent. Consequently, the solvent in the emulsion is vaporized and flashed from the emulsion with most of the vaporization occurring at the time of contact between the emulsion and heated liquid medium. The plastic material is then in the liquid medium in a finely-divided form, and it is readily recoverable therefrom.

Very finely-divided particles having an average particle size of 2 to 10 microns and a maximum particle size not greater than 15 microns in diameter have been prepared successfully by this method. Plastics so prepared have a bulk density of 0.35 to 0.45 g./ml., and they are in the form of regular, hollow spheroids. Such finely-divided materials offer a number of opportunities for expanding the use of film-forming plastics into new applications, and advantages are offered in other fields of application over existing forms of flake and granular cellulose derivatives.

The advantages for the finely divided plastics of this invention are directly related to the extremely small particle size and to the configuration and texture imparted to the particles by the method of preparation. An attractive feature is that preformulated compositions containing plasticizing agents and pigments can be prepared in this way in extremely small particles, homogeneous in composition and free of solvent, which can then be fabricated by new methods. New methods for which these particles are particularly adapted are organosols, hydrosols, plastisols, and flame spraying.

The following examples are illustrative of the invention:

EXAMPLE 1

Approximately 1.5 liters of emulsion containing 12.5 parts cellulose acetate, 70 parts methylene chloride, 17.5 parts ethanol, 0.125 part sodium dioctyl sulfosuccinate, and 40 parts water was run at a rate of 10 to 15 volumes per minute into a flask containing 1000 volumes of water at a temperature of 85° to 90° C. Over 95% of the product consisted of uniform spheroids of cellulose acetate approximately 5 microns in diameter.

EXAMPLE 2

An emulsion of the same type as Example 1 was fed at a rate of 18.75 to 25 volumes per minute into a flask containing 1000 volumes of water at 85° to 90° C. After a product concentration of approximately 10% was attained in the flask, product removal and addition of water were started at rates suitable to keep the concentration at 10%. The run continued for approximately 4 hours yielding a product slurry of 12.4% total solids and particle size of 1 to 3 microns.

EXAMPLE 3

An emulsion containing 20 parts ethyl cellulose, 72 parts methylene chloride, 8 parts ethanol, 0.1 part sodium dioctyl sulfosuccinate and 50 parts water was precipitated by running a small stream of the emulsion into agitated boiling water. The resultant product was very fine and uniform.

EXAMPLE 4

An emulsion of the same formulation as Example 3, but using sodium lauryl sulfate as the emulsifying agent, was precipitated continuously into water at 87° to 90° C. The resulting slurry had a concentration of 10.5% and very fine uniform particles.

EXAMPLE 5

An emulsion containing 7 parts type RS Nitrocellulose, 15- to 20-sec., 0.4 parts methylene chloride, 32.6 parts ethyl acetate, 0.07 part sodium dioctyl sulfosuccinate, and 40 parts water was flash precipitated at the rate of 18.75 to 25 volumes of emulsion per minute into 1000 volumes of water at 85° to 90° C. The product obtained was fine and uniform.

EXAMPLE 6

An emulsion containing 15 parts of type SS Nitrocellulose, ½-sec., 55.25 parts methylene chloride, 29.75 parts methyl acetate, 0.15 part sodium dioctyl sulfosuccinate, and 50 parts water was flash precipitated at a rate of 25 to 31.25 volumes of emulsion per minute into 1000 volumes of water at a temperature of 85° to 90° C. The product obtained was very fine and uniform.

EXAMPLE 7

An emulsion containing 15 parts type RS Nitrocellulose, ½-sec., 55.25 parts methylene chloride, 29.75 parts ethyl acetate, 0.15 part sodium dioctyl sulfosuccinate and 50 parts of water was continuously precipitated into water at a temperature of 85° to 90° C. The product obtained was very fine and uniform.

In Table 1 below are shown various emulsion compositions containing either cellulose acetate or ethyl cellulose, that where employed in practicing this invention. Tables 2 and 3 list various emulsions containing nitrocellulose and preplasticized nitrocellulose, respectively, that were similarly employed. The compositions are listed in parts by weight. Table 4 lists the average and maximum particle sizes in microns of the finely-divided resins resulting from the use of the emulsions in Tables 1, 2 and 3 in this invention.

*Table 1*

EMULSION COMPOSITIONS CONTAINING CELLULOSE ACETATE OR ETHYL CELLULOSE

| Type | Cellulose Acetate | Cellulose Acetate | Cellulose Acetate | Ethyl Cellulose | Ethyl Cellulose | Ethyl Cellulose |
|---|---|---|---|---|---|---|
| | Parts | Parts | Parts | Parts | Parts | Parts |
| Cellulose Acetate or Ethyl Cellulose | 12.5 | 12.5 | 15.0 | 20.0 | 20.0 | 20.0 |
| Methylene Chloride | 70.0 | 70.0 | 68.0 | 72.0 | 72.0 | 72.0 |
| Ethanol | 17.5 | 17.5 | 17.0 | 8.0 | | |
| Methanol | | | | | 8.0 | 8.0 |
| Sodium Dioctyl Sulfosuccinate | 0.125 | 0.125 | 0.15 | 0.1 | | |
| Sodium Lauryl Sulfate | | | | | 0.1 | 0.2 |
| Water | 40.0 | 40.0 | 50.0 | 50.0 | 40.0 | 70.4 |

*Table 2*

EMULSION COMPOSITIONS CONTAINING NITROCELLULOSE

| Type | RS Nitrocellulose, ½-sec. | RS Nitrocellulose, ½-sec. | RS Nitrocellulose, ½-sec. | RS Nitrocellulose, ½-sec. | RS Nitrocellulose, 15 to 20 sec. | SS Nitrocellulose, ½-sec. | SS Nitrocellulose, ½-sec. |
|---|---|---|---|---|---|---|---|
| | Parts | Parts | Parts | Parts | Parts | Parts | Parts |
| Nitrocellulose | 15.0 | 19.0 | 15.0 | 15.0 | 7.0 | 15.0 | 15.0 |
| Methylene Chloride | 55.2 | 53.0 | 55.2 | 55.2 | 60.4 | 55.2 | 55.2 |
| Ethyl Acetate | 29.8 | 28.0 | 29.8 | 29.8 | 32.6 | | |
| Methyl Acetate | | | | | | 29.8 | 29.8 |
| Sodium Dioctyl Sulfosuccinate | 0.15 | 0.25 | 0.15 | | 0.07 | 0.2 | 0.15 |
| Polyoxyalkylene Sorbitan Monostearate | | | | 0.6 | | 0.6 | |
| Water | 50.0 | 50.0 | 40.0 | 40.0 | 40.0 | 40.0 | 50.0 |

*Table 3*

EMULSION COMPOSITIONS CONTAINING PREPLASTICIZED NITROCELLULOSE

| Type | RS Nitrocellulose, 15- to 20-sec. | RS Nitrocellulose, 15- to 20-sec. | SS Nitrocellulose, ½-sec. | SS Nitrocellulose, ½-sec. | SS Nitrocellulose, ½-sec. | SS Nitrocellulose, ½-sec. |
|---|---|---|---|---|---|---|
| Plasticizer | 40% Dibutyl Phthalate | 60% Dibutyl Phthalate | 40% Dicyclohexyl Phthalate | 40% Dicyclohexyl Phthalate | 40% Dicyclohexyl Phthalate | 18% Dibutyl Phthalate |
| | Parts | Parts | Parts | Parts | Parts | Parts |
| Nitrocellulose | 6.7 | 6.3 | 8.9 | 9.0 | 9.0 | 12.3 |
| Methylene Chloride | 57.7 | 55.1 | 55.0 | 55.2 | 55.2 | 55.2 |
| Ethyl Acetate | 31.1 | 29.6 | | | | |
| Methyl Acetate | | | 29.4 | 29.8 | 29.8 | 29.8 |
| Dibutyl Phthalate | 4.5 | 9.5 | | | | 2.7 |
| Dicyclohexyl Phthalate | | | 6.7 | 6.0 | 6.0 | |
| Sodium Dioctyl Sulfosuccinate | 0.11 | 0.16 | 0.2 | 0.09 | 0.09 | 0.12 |
| Tributyl Phthalate | 0.1 | 0.2 | | | | |
| Water | 50.0 | 50.0 | 170.0 | 100.0 | 50.0 | 50.0 |

Table 4

| Type | Particle Size, Microns | |
| --- | --- | --- |
| | Average | Maximum |
| RS Nitrocellulose, ½-sec | 2 | 5 |
| RS Nitrocellulose, ½-sec | 3 | 5 |
| SS Nitrocellulose, ½-sec. (40% dicyclohexyl phthalate) | 8 | 15 |
| SS Nitrocellulose, ½-sec.(18% dibutyl phthalate) | 8 | 10 |
| Cellulose Acetate | 5 | 10 |
| Ethyl Cellulose | 5 | 15 |

In carrying out the above examples the aqueous emulsion containing the film-forming plastic was passed into a heated and agitated body of water. Other liquid media can be employed, but, because of its availability and cheapness, water is the preferred medium. It is essential that the film-forming plastic be insoluble in the liquid medium, and at the pressure employed the liquid medium should have a boiling point at least equal to, and preferably above, the boiling point of the solvent for the film-forming resin. The temperature at which the water is maintained is usually within the range of 80° to 100° C., but it is possible to employ temperatures outside this range. For example, when highly plasticized plastics which soften and agglomerate at moderate temperatures are employed in practicing this invention, it is desirable to carry out the process at a subatmospheric pressure, and in that event temperatures as low as 50° C. and lower can be used in the process. The purpose of the use of a subatmospheric pressure is to permit and make feasible the use of lower temperatures of the liquid medium. Any of the various methods can be used to form and stabilize the lacquer-in-water emulsion. For example, the mixture containing the film-forming plastic can be passed through a colloid mill or homogenizer or emulsification can be effected by supersonic means or by simple agitation of the mixture. Any available type of emulsifying agent can be used, and in the above specific examples illustrative emulsifying agents which are effective in carrying out the process are described.

In order to obtain finely-divided plastic particles and efficient evaporation of plastic solvent, the water or other liquid medium is maintained in an agitated condition, and any suitable means of agitation can be used. A preferred method of agitation involves the use of mechanical mixers or agitators, but it is within the scope of the invention to employ other methods of agitation.

The solvent that is employed in the emulsion is substantially water-immiscible. In the specific examples a combination of water-miscible and water-immiscible solvents was used, but the ratio of solvents was such that the resulting combination formed by them was substantially water-immiscible. The use of such a combination of solvents is not essential and, if desired, a water-immiscible solvent can be used without the addition of a water-miscible solvent. When using a combination of solvents, it is preferable that the water-immiscible solvent be lower boiling than the water-miscible solvent. In addition to the water-miscible and water-immiscible solvents set out in the examples, other solvents can be used. For example, n-propanol, isopropanol, n-butanol, acetone, and the like, are water-soluble solvents that can be used alone or in combination with other solvents, such as ethyl chloride, ethylene dichloride, appropriate hydrocarbons, and the like. With an ethyl cellulose or cellulose acetate formulation it is preferred to employ a solvent containing from 80 to 95 parts by weight of methylene chloride and from 20 to 5 parts by weight of a lower aliphatic alcohol such as methanol, ethanol, propanol, and butanol. With a nitrocellulose formulation, it is preferred to employ a solvent containing from 60 to 70 parts by weight of methylene chloride and from 40 to 30 parts by weight of a lower aliphatic ester, for example, methyl acetate and ethyl acetate. When an ethyl cellulose or cellulose acetate formulation is used, it is preferred to prepare a solution containing from 10 to 20% of the cellulosic plastic, and with a nitrocellulose formulation the preferred solutions contain from 7 to 15% nitrocellulose.

In preparing the premix before colloiding, several schemes are operable: (1) add water and emulsifier to the lacquer phase, (2) add water to the lacquer phase containing emulsifier, (3) add solvent to a mixture of water, plastic and emulsifier, or (4) add plastic to an emulsion of solvent and water. Method (2) has been used in the examples, but the process is not restricted to this method. Any of the other methods outlined are operable.

The process of the invention is generally applicable to cellulosic plastics compositions. Among the applicable cellulosics are single esters, such as cellulose acetate, cellulose propionate, cellulose butyrate, cellulose benzoate, cellulose stearate, cellulose crotonate, and nitrocellulose; mixed esters, such as cellulose acetate propionate, cellulose acetate butyrate, cellulose acetate benzoate, and cellulose acetate crotonate; ethers such as ethyl cellulose, benzyl cellulose, and the like; and mixed ester-ethers, such as ethyl hydroxyethyl cellulose, hydroxyethyl cellulose acetate, ethyl cellulose acetate, ethyl cellulose crotonate, benzyl cellulose acetate, and the like.

From the above examples it is apparent that the film-forming plastics themselves can be prepared in a finely-divided form or, if desired, a formulation containing the film-forming plastic and a plasticizing agent can also be prepared in a finely-divided form in accordance with this invention. Typical examples which are illustrative of the plasticizing agents that can be used are set forth in the above examples.

The rate at which the emulsion is introduced to the agitated, hot liquid medium is dependent upon variables, such as the dimensions and construction of the vessel containing the liquid medium, the type of liquid medium employed, and the like. The rate of introduction is such that it is possible to maintain the temperature of the liquid medium at or above the desired level. Also, foaming of the mixture of liquid medium, finely-divided solid plastic and emulsion sometimes presents a problem, and the rate of introduction of emulsion is adjusted to minimize the extent of the foaming. Actually, for most practical purposes the rate of introduction of emulsion will not exceed 0.5 volume of emulsion per minute per 10 volumes of water or other liquid medium.

This method of preparing a film-forming plastic in a finely-divided form is adaptable to either a batch process or a continuous process. In a batch process the precipitation of the finely-divided plastic into a body of water or other liquid medium is continued until a concentration of about 10 to 20 weight per cent of the plastic in the water or other liquid medium is obtained. Then the liquid medium and finely-divided plastic are removed from the vessel and treated by any suitable means for recovering the finely-divided plastic. When employing a continuous precipitation procedure, the precipitation is effected until the water or other liquid medium contains from 5 to 20% by weight of the finely-divided plastic. A portion of the liquid medium containing the finely-divided plastic is then continuously removed from the operating vessel and fresh water or other liquid medium and aqueous emulsion are continually added to the vessel. The rate of product removal and of addition of water or other liquid medium are limited by the optimum emulsion feed rate, and they can be readily determined by a material balance for the system.

The product from either a batch or a continuous process is water or other liquid medium containing up to about 20% by weight of the finely-divided film-forming plastic. The plastic can be recovered by any of various methods such as filtration, decantation, centrifuging and the like, and most simply by drying the resultant slurry by means of conventional dryers, e. g., drum, vacuum, or spray dryers. When preparing a nitrocellulose plastic in a finely-divided form in accordance with this invention, the final product should be at least water-wet, and it preferably contains a substantial amount of water in order to minimize fire hazards. If desired, the water in the nitrocellulose can be replaced with an alcohol, such as ethyl alcohol, in order to facilitate the shipment or other handling of the product.

The products of this process are particularly useful in the application of plasticized cellulosic plastic coatings without recourse to the expense or hazards associated with the use of solvents. This may be accomplished by utilizing the finely-divided plastics, produced as shown, as dispersions in water (hydrosols) with or without suitable plasticizers, as dispersions in nonsolvent organic media (organosols) with or without suitable plasticizers, and as dispersions in certain selected plasticizers (plastisols).

From the above disclosure various modifications and alterations within the scope of the invention will be apparent to those skilled in the art.

What I claim and desire to protect by Letters Patent is:

1. The process for preparing a finely-divided plastic composition which comprises forming an oil-in-water emulsion containing, in addition to water, a film-forming substantially water-insoluble cellulosic plastic selected from the group consisting of cellulose esters and ethers containing no other elements than carbon, hydrogen, oxygen and nitrogen and a substantially water-immiscible volatile solvent for said plastic consisting essentially of a mixture of a lower alkyl chloride and an auxiliary solvent having a boiling point below the boiling point of water selected from the group consisting of lower alkanols and lower alkyl acetates, passing a stream of emulsion thus formed into a vessel containing an agitated body of hot water, the temperature of said hot water being maintained not below the boiling point of said volatile solvent at the pressure employed whereby said plastic is precipitated in said body of hot water in a finely divided form having a particle size not greater than 15 microns.

2. The process for preparing a finely-divided plastic composition which comprises forming a solution containing from 10 to 20% of a substantially water-insoluble organic cellulose ester containing no other elements than carbon, hydrogen and oxygen in a solvent mixture containing from 80 to 95 parts by weight of methylene chloride and from 20 to 5 parts by weight of a lower alkanol having a boiling point below the boiling point of water forming an oil-in-water emulsion with the resulting solution, passing a stream of the resulting emulsion into a vessel containing an agitated body of hot water, maintaining said hot water at a temperature within the range of 80° to 100° C. and at atmospheric pressure to vaporize said solvent mixture whereby said cellulose ester is precipitated in said body of hot water in a finely divided form having an average particle size of 2 to 10 microns and a bulk density of 0.35 to 0.45 gram per ml.

3. The process according to claim 2 wherein the cellulose ester is cellulose acetate and the lower alkanol is ethyl alcohol.

4. The process for preparing a finely-divided plastic composition which comprises forming a solution containing from 10 to 20% of a substantially water-insoluble cellulose ether containing no other elements than carbon, hydrogen and oxygen in a solvent mixture containing from 80 to 95 parts by weight of methylene chloride and from 20 to 5 parts by weight of a lower alkanol having a boiling point below the boiling point of water, forming an oil-in-water emulsion with the resulting solution, passing a stream of the resulting emulsion into a vessel containing an agitated body of hot water, maintaining said hot water at a temperature within the range of 80° to 100° C. and at atmospheric pressure to vaporize said solvent mixture whereby said cellulose ether is precipitated in said body of hot water in a finely divided form having an average particle size of 2 to 10 microns and a bulk density of 0.35 to 0.45 gram per ml.

5. The process according to claim 4 wherein the cellulose ether is ethyl cellulose and the lower alkanol is ethanol.

6. The process for preparing a finely-divided plastic composition which comprises forming a solution containing from 7 to 15% of a nitrocellulose in a solvent mixture containing from 60 to 70 parts by weight of methylene chloride and from 40 to 30 parts by weight of lower alkyl acetates having a boiling point below the boiling point of water, forming an oil-in-water emulsion with the resulting solution, passing a stream of the resulting emulsion into a vessel containing an agitated body of hot water, maintaining said hot water at a temperature within the range of 80° to 100° C. and at atmospheric pressure, to vaporize said solvent mixture whereby said nitrocellulose is precipitated in said body of hot water in a finely divided form having an average particle size of 2 to 10 microns and a bulk density of 0.35 to 0.45 gram per ml.

7. The process according to claim 6 wherein the lower alkyl acetate is methyl acetate.

8. The process according to claim 6 wherein the lower alkyl acetate is ethyl acetate.

References Cited in the file of this patent

UNITED STATES PATENTS

| Number | Name | Date |
|---|---|---|
| 1,870,864 | Pratt et al. | Apr. 9, 1932 |
| 1,936,989 | Peters | Nov. 28, 1933 |
| 2,006,362 | Malm | July 2, 1935 |
| 2,272,152 | Moore | Feb. 3, 1942 |